(12) United States Patent
Sticht

(10) Patent No.: US 6,839,957 B1
(45) Date of Patent: Jan. 11, 2005

(54) DISPLACEMENT UNIT

(76) Inventor: Walter Sticht, Waggerl-Strasse 8, A-4800 Attnang-Puchheim (AT)

( * ) Notice: Subject to any disclaimer, the term of this patent is extended or adjusted under 35 U.S.C. 154(b) by 0 days.

(21) Appl. No.: 09/485,947
(22) PCT Filed: Aug. 18, 1998
(86) PCT No.: PCT/AT98/00194
§ 371 (c)(1), (2), (4) Date: Apr. 21, 2000
(87) PCT Pub. No.: WO99/09462
PCT Pub. Date: Feb. 25, 1999

(30) Foreign Application Priority Data

Aug. 18, 1997 (AT) ............................................. 1384/97

(51) Int. Cl.[7] ............................................... B23P 21/00
(52) U.S. Cl. ........................................... 29/714; 29/709
(58) Field of Search ......................... 29/714, 709, 720, 29/701, 407.01, 407.09, 407.1; 91/1, 397

(56) References Cited

U.S. PATENT DOCUMENTS

| | | |
|---|---|---|
| 3,943,343 A | 3/1976 | Irie |
| 4,385,685 A | 5/1983 | Sticht |
| 4,510,683 A | 4/1985 | Fedde et al. |
| 4,841,450 A | 6/1989 | Fredriksson |
| 4,872,257 A | 10/1989 | Wakamori et al. |
| 5,349,730 A | 9/1994 | Anderson et al. |
| 5,351,599 A | 10/1994 | Stoll |

FOREIGN PATENT DOCUMENTS

| | | |
|---|---|---|
| AT | 389 837 | 2/1990 |
| DE | 40 15 037 | 11/1990 |
| DE | 41 06 689 | 10/1991 |
| DE | 40 37 901 | 6/1992 |
| DE | 42 32 519 | 3/1994 |
| EP | 0 240 965 | 10/1987 |
| EP | 0 275 992 | 7/1988 |
| EP | 0 767 267 | 4/1997 |
| FR | 2 657 807 | 8/1991 |
| WO | WO 97/23839 | 7/1997 |

OTHER PUBLICATIONS

10. Aachener Fluidtechnisches Kolloquium; Beitraege zum Fachgebiet Hydraulik, vol. 2, Mar. 17.–19, 1992=Citation 1.

Elektrohydraulische Achse mit integrierter Elektronik by G. Scheffel et al, Journal o+p; 1986; No. 6, pp. 458 et seq.= Citation 2.

Elektropneumatik; by R. Balla; Mannesmann Rexroth; 1990 edit.; pp. 80 et seq.=Citation 3.

Fukuda, T. et al (1994) "Fuzzy, Neural Network, and Genetic Algorithm Based Control System", Proceedings of the International Conference on Industrial Electronic Control and Instrumentation, Sep. 5–9, 1994, pp. 1220–1225.

*Primary Examiner*—John C. Hong
(74) *Attorney, Agent, or Firm*—Collard & Roe, P. C.

(57) ABSTRACT

The invention describes a displacement unit (1) for example for supply, manipulation, guiding or control systems of mounting parts (2), with components (3, 4) that can be adjusted relative to one another by means of a drive unit (5) and with at least one guiding device (6) for at least one of the components (3; 4) and a control unit (7). At least one member (8) of the control unit (7) used for processing logic information or bus information is integrated into the drive unit (5) and/or into at least one of the components (3; 4) and/or is mounted on one of the components (3; 4).

33 Claims, 10 Drawing Sheets

US 6,839,957 B1

DISPLACEMENT UNIT

CROSS REFERENCE TO RELATED APPLICATIONS

Applicant claims priority under 35 U.S.C. §119 of Austrian Application No. A1384/97 filed Aug. 18, 1997. Applicant also claims priority under 35 U.S.C. §365 of PCT/AT98/00194 filed Aug. 18, 1998. The international application under PCT article 21(2) was not published in English.

BACKGROUND OF THE INVENTION

1. Field of the Invention

The invention relates to a displacement unit for a manipulation system.

2. The Prior Art

From DE 41 06 689 A1 a method for controlling a processing machine is known, in particular an assembly machine and similar processing machine. The latter comprises a plurality of workpiece carriers, which are moved past workstations on a moving track or work line in transport direction. The latter are designed respectively for at least one prespecified procedure and are controlled at least partly by an electronic control unit. Each workstation has its own electronic control unit, which is equivalent to the control units of other workstations, whereby the control unit of each workstation only cooperates with the immediately following and/or immediately preceding workstation via a data and control line. At the first workstation an electronic protocol is established for each workpiece carrier, which in addition to an identification identifying or characterizing said workpiece carrier contains the work to be performed in transport direction at subsequent workstations. Said protocol is then sent according to the work stages via a data line from the control unit of the preceding workstation to the control unit of the subsequent workstation. The disadvantage of this design is that the individual workstations comprise various different components according to the work to be performed, which excludes the serial manufacture of the various components. In this way it is not possible to produce such an assembly machine using standardized individual components, which is disadvantageous for the manufacturing costs of such an assembly machine. A further disadvantage is that once a production process has been commenced it is not possible to intervene to correct an erroneous protocol for example. Furthermore, the central monitoring or direct programming of a particular workstation is not possible for example with an additional simulation procedure.

EP 0 240 965 shows a compact electrohydraulic switching module which is used, for example, for driving displacement units which comprises a valve piston and a valve housing surrounding the valve piston with a drive arrangement formed by a coil, whereby the drive arrangement is driven by a command processing element, for example a microprocessor.

In EP 0 275 992, a method for driving a machine system, for example production lines, conveyor systems etc, with several actuators, especially electric motors but also other electrically controllable and electromechanical actuating devices are described, whereby some of the actuators are combined into a group and a control unit is assigned to each of the actuators in this group.

Similarly, a decentralized drive, for example of a displacement unit, is also described in FR 2 657 807.

SUMMARY OF THE INVENTION

The object of the present invention is to create a displacement unit which is composed of separate standardized components and can be integrated as a standardized component itself into a complete system and thus a modular structure—for example an assembly line—can be created.

The object of the invention is achieved according to one aspect thereof with a displacement unit for a manipulation system, which comprises components which are adjustable relative to each other, a guiding device for guiding the components, and a control unit. The control unit has a pressure fluid control valve for actuating one of the components by the pressure fluid, and a control module cooperating with the pressure fluid control valve and comprising a logic unit, the control module being connectable to a central control unit by interface. The control unit is integrated into one of the components. The surprising advantage is that the control unit is connected directly to the displacement unit and thus expensive installation of wiring can be avoided on the one hand and specific functions of the adjusting unit can be preset without external programming. In this way for example the expense of programming can be reduced considerably and it is possible to produce the transport devices in series as standard units without the special manufacture of parts designed for specific uses being necessary. In addition, accessibility to the individual components in the region of a machine is considerably improved if the two supply lines leading from the pressure fluid control valve to the drive unit are omitted by integrating the pressure fluid control valve into the drive unit or the components. A further advantage is the short lines which prevents undesired damping caused by the elastic stretching of the feed lines, friction losses etc., resulting in a considerable improvement in switching times, reaction times etc.

The object is also achieved according to another aspect of the invention with a displacement for a manipulation system, which comprises components which are adjustable relative to each other, a pressure fluid drive for adjusting the components, the device having an outer surface, a guiding device for one of the components, and a control unit. The control unit has a pressure fluid control valve connected to the drive for actuating the drive by the pressure fluid, a control module cooperating with the pressure fluid control valve and comprising a logic unit, the control module being connectable to a central control unit by an interface, and a display element. The pressure fluid control valve and the control module are mounted on the outer surface of the drive. In addition to the advantages described hereinabove, a surprising advantage over and above the overall effect can be achieved in that the short switching times and ways of optimizing the overall displacement sequence can be combined with the thereby achievable greater availability.

BRIEF DESCRIPTION OF THE DRAWING

The invention is explained in more detail in the following by way of the embodiments illustrated in the drawings.

These show.

DESCRIPTION OF THE PREFERRED EMBODIMENTS

First of all it should be noted that in the descriptions of the various embodiments the same parts are given the same reference numbers or component names, whereby the disclosures contained throughout the description can be applied to the same parts with the same reference numbers or the same component names. Also the details relating to position, such as e.g. top, bottom, side etc. relate to the Figure being described and should be transposed to a new position when the position has changed. Furthermore, individual features of the various embodiments shown can represent independent solutions according to the invention.

Figure 1:
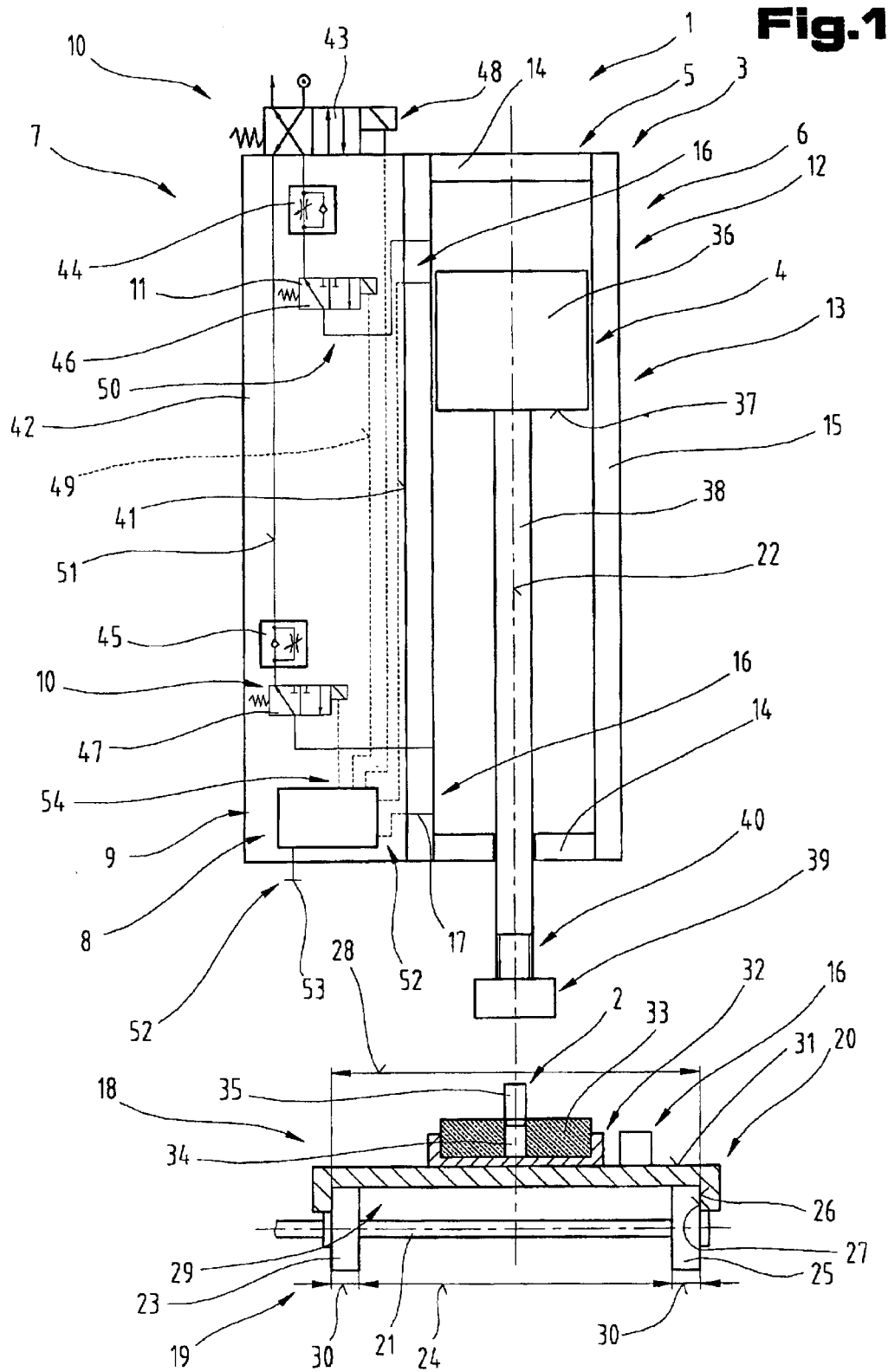
FIG. 1 a displacement unit according to the invention, in cross section, in front elevation.

In FIG. 1 a displacement unit 1 for example for supply, manipulation, joining or control systems of an assembly system for assembly parts 2 is shown. The unit comprises components 3, 4 that can be displaced relative to one another using a drive unit 5, for example by means of compressed air, electricity or hydraulic fluid. Furthermore, the displacement unit 1 comprises at least one guiding device 6 for at least one of the components 3, 4. The displacement unit 1 also comprises a control unit 7, at least one member 8 of the control unit 7 processing logic information or bus information and a command is integrated into the drive unit 5 or into at least one of the components 3, 4.

The control unit 7 comprises at least one control module 9 and one or more pressure fluid control valves 10 is designed for example as pneumatic valve 11. It can however also be designed as a relay or as a contactor. The control unit 7, in particular the pressure fluid control valves 10 are connected to the drive unit 5, which is designed for example as a pneumatic drive 12, hydraulic drive, servomotor drive, electric motor drive, manual drive or piezo drive. The pneumatic drive 12 has the form of a pneumatic cylinder 13. The latter comprises parallel closing elements 14, which can be adjusted relative to one another and are mounted in a cylindrical pipe 15, whereby the volume and the displacement of the cylinder can be changed. Cylindrical pipe 15 forms the guiding device 6 in the present embodiment. In component 3, in particular in the cylindrical pipe 15, are signalling and monitoring members 16, which are designed for example as limit switches or proximity switches 17 or as a displacement measuring system or position detecting system.

At least one assembly part 2 is located on a transport device 18, which in the present embodiment comprises a drive and guiding device 19 and workpiece carrier 20. The drive and guiding device 19 comprises for example drive axes 21, which run perpendicular to the transport device and to a central axis 22 of the pneumatic cylinder 13. A drive wheel 23 is arranged on the drive axis 21 and secured thereto and can be made for example of plastic or metal with a plastic coating. Spaced apart from the drive wheel 23 at a distance 24 measured parallel to the drive axis 21 is a guiding wheel 25 which is not fixed by secured to drive axis 21 for example. The guiding wheel 25, in particular a surface 26 thereof is pressed for example by means of elastic force against a flank surface 27 of the workpiece carrier 20 running parallel thereto and at right angles to the drive axis 21, an inner spacing 28 of a recess 29 of the workpiece carrier 20 parallel to the distance 24 corresponding to the distance 24 plus a double wheel width 30.

On an upper side 31 of the workpiece carrier 20 facing away from the recess 29 and facing the displacement unit 1, which upper side is perpendicular to the central axis 22, is a mount 32 attached detachably or non-detachably to the upper side 31 in which assembly part 2 is arranged. The latter is designed as roller 33 made of plastic for example, which has a cylindrical bore 34 in which a bolt 35 also forming an assembly 2 is to be pressed. Of course, the use of such a displacement unit 1 is not only restricted to transport devices 18 with workpiece carriers 20 for assembly parts 2 described.

The pneumatic cylinder 13 has a piston 36 forming the component 4, which has a piston surface 37 at right angles to the central axis 22, beyond which a piston rod 38 projects. In an end region of the piston rod 38 facing away from the piston surface 37 the former comprises in the present embodiment a pressure piece 39, which is screwed onto the piston rod 38, in particular onto a threaded section 40 thereof. In this way the displacement unit 1 in the present embodiment acts as a joining system, in particular as a pressing device for assembly parts.

On an outer surface 41 of the cylindrical pipe 15 is the control unit 7, which is mounted for example on a console 42 connected detachably or non-detachably to the outer surface 41. The pressure fluid control valves 10 are preferably connected detachably to the console 42 and are formed by a 4/2-way-valve 43, two restrictor return valves 44, 45 and two 3/2-way-valves 46, 47. The pressure fluid control valves 10 comprise for example electrically operated drives 48, which are connected by control lines 49 to the control module 9 illustrated by dashed lines. Of course, it is possible to design the control lines 49 not only as free, i.e. flexible, lines but to integrate them into an electric distribution bar or cable channel. The fluid pressure control valves 10 are connected according to their switching function for example by lines 50, in particular pneumatic pipes 51. The control module 9 has inputs 52, for example for signals and commands of signalling and monitoring members 16 or for signals and commands of an additional control unit 7 of further displacement units 1 or external input and output devices or drive units 5 and power or pressure fluid control valves 10, the inputs 52 being connected for example by single point plugs with single lines, which can also be connected non-detachably to the inputs 52.

The inputs 52 can also be connected by at least one multipoint plug with at least one multi-point line or by a bus connector plug 53 to a central connecting line. The control module 9 also comprises outputs 54 which permit the output of signals and commands to the pressure fluid control valves 10. Furthermore, outputs 54 can be used for example for signals and commands to the signalling and monitoring members 16 of additional displacement units 1 or to external input and output devices or to drive units 5 and for power. The output of signals and commands can be performed by means of the bus connector plug 53 which also forms an input 52.

Figure 2:
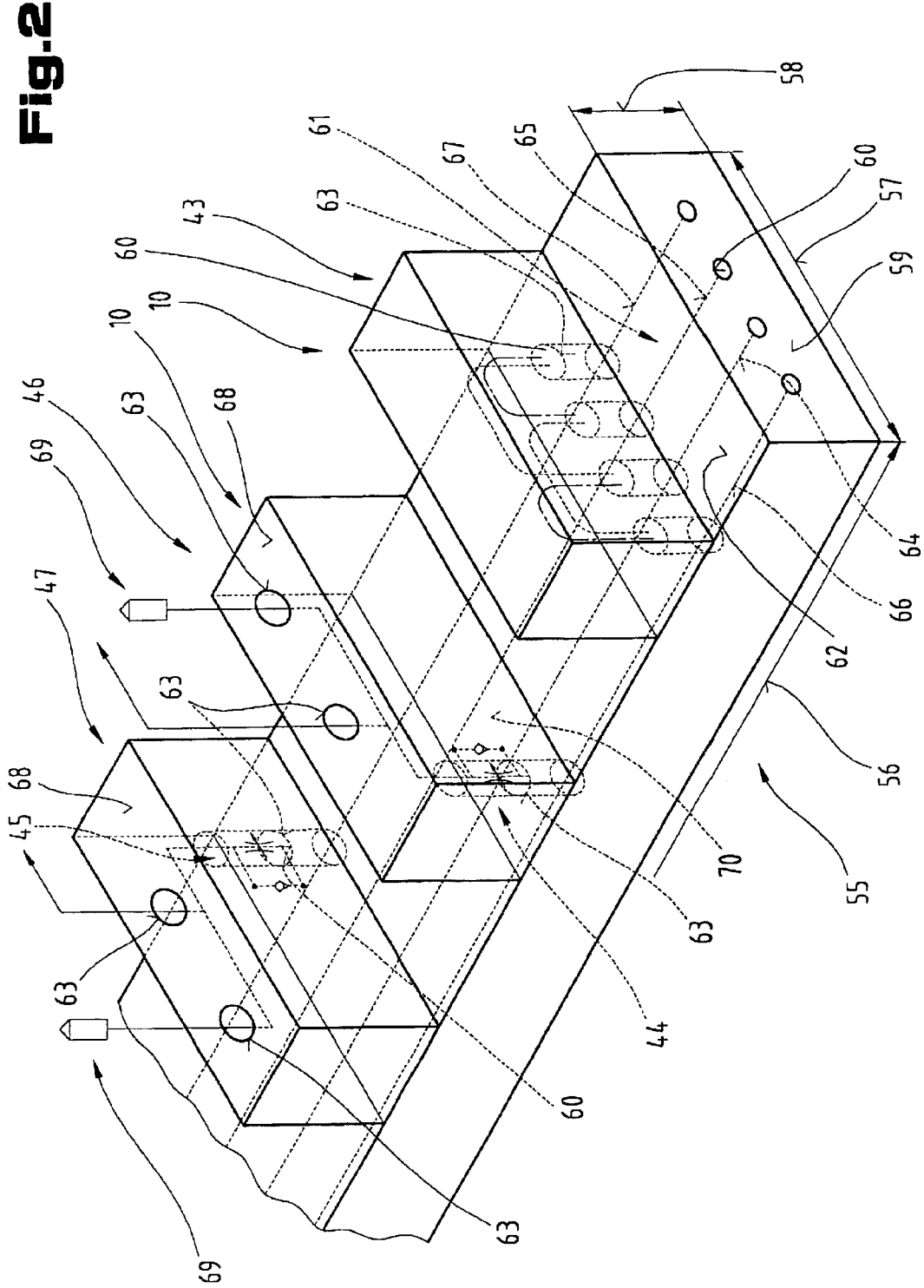
FIG. 2 a section of the displacement unit 1 of the invention, in particular a control unit, in perspective view.

The outputs 54 can like the inputs 52 be connected by single point plugs with single lines or by one or an additional multipoint plug to one or other multipoint line or via one or other additional bus connector plug 53 to one or other additional central connecting line. As shown in FIG. 2 the lines 50 shown in FIG. 1, in particular the pneumatic pipes 51 can be substituted or supplemented by a pneumatic distribution bar 55. The distribution bar 55 has a length 56 and a width 57 perpendicular thereto, which with a height 58 measured perpendicular to the width 57 delimits an end face 59. The latter comprises openings 60 for channels 61 which extend for example over the entire length 56, parallel to the latter and parallel to one another.

On an upper side 62 running perpendicular to the end face 59 and having the length 56 and the width 57, openings 60 are also provided for the pressure fluid control valves 10. Thus for the 4/2-way-valve 43 adjacent to the end face 59 on the upper side 62 there are four openings 60 connected to corresponding openings 63 in the pressure fluid control valves 10. The channels 61 are formed for example by an air inlet channel 64, an air outlet channel 65 and two connecting channels 66, 67. An opening 63 of the 4/2-way-valve 43 is connected to a channel 61 for example by a plug. Spaced apart from the 4/2-way-valve 43 in the opposite direction to the end face 59 is the 3/2-way-valve 46. The latter also comprises openings 63, one of which is connected preferably detachably with the connecting channel 66, and in which the restrictor return valve 44 is arranged. Facing away from the upper side 62 of the pneumatic distribution bar 55 and parallel to the latter the 3/2-way-valve 46 is delimited by an upper side 68, which comprises two openings 63, one opening 63 comprising for example a sound damper 69, whereas the other opening 63 is connected to the pneumatic cylinder 13 shown in FIG. 1. The latter openings 63 can however also be arranged on the underside 70 of the 3/2-way-valve 46 facing the upper side 62 and away from the upper side 68, as a result of which in the pneumatic distribution bar 55 further channels 61 would be necessary.

Spaced apart from the 3/2-way-valve 46 in the opposite direction to the 4/2-way-valve 43 is the 3/2-way-valve 47, which is connected by an opening 63 through an opening 60 arranged in the upper side 62 of the distribution bar 55 with the connecting channel 67. Out of the opening 63 a restrictor return valve 45 extends inside the 3/2-way-valve 47. There are also openings 63 on the upper side 68 of the 3/2-way-valve 47, one opening 63 having a sound damper 69, and the other opening 63 being connected to the pneumatic cylinder 13 shown in FIG. 1. Such a connection of pressure fluid control valves 10 is preferably used for the end position damping of pneumatic cylinder 13 to be explained in more detail.

Of course in this way any arrangement of pressure fluid control valves 10 and thereby the realization of various controls can be achieved. Accordingly the number of channels 61 arranged in the pneumatic distribution bar 55 and the pressure fluid control valves 10 arranged on the pneumatic distribution bar 55 can be varied as desired. It is also possible to integrate the pressure fluid control valves 10 into the pneumatic distribution bar 55 and not, as shown by way of example, to arrange them detachably or non-detachably on the upper side 62. In addition, the pressure fluid control valves 10 can also be arranged on or in the cylindrical pipe 15 instead of being arranged on a pneumatic distribution bar 55. In particular at least one component 3; 4 can comprise a pneumatic distribution bar 55.

Figure 3:
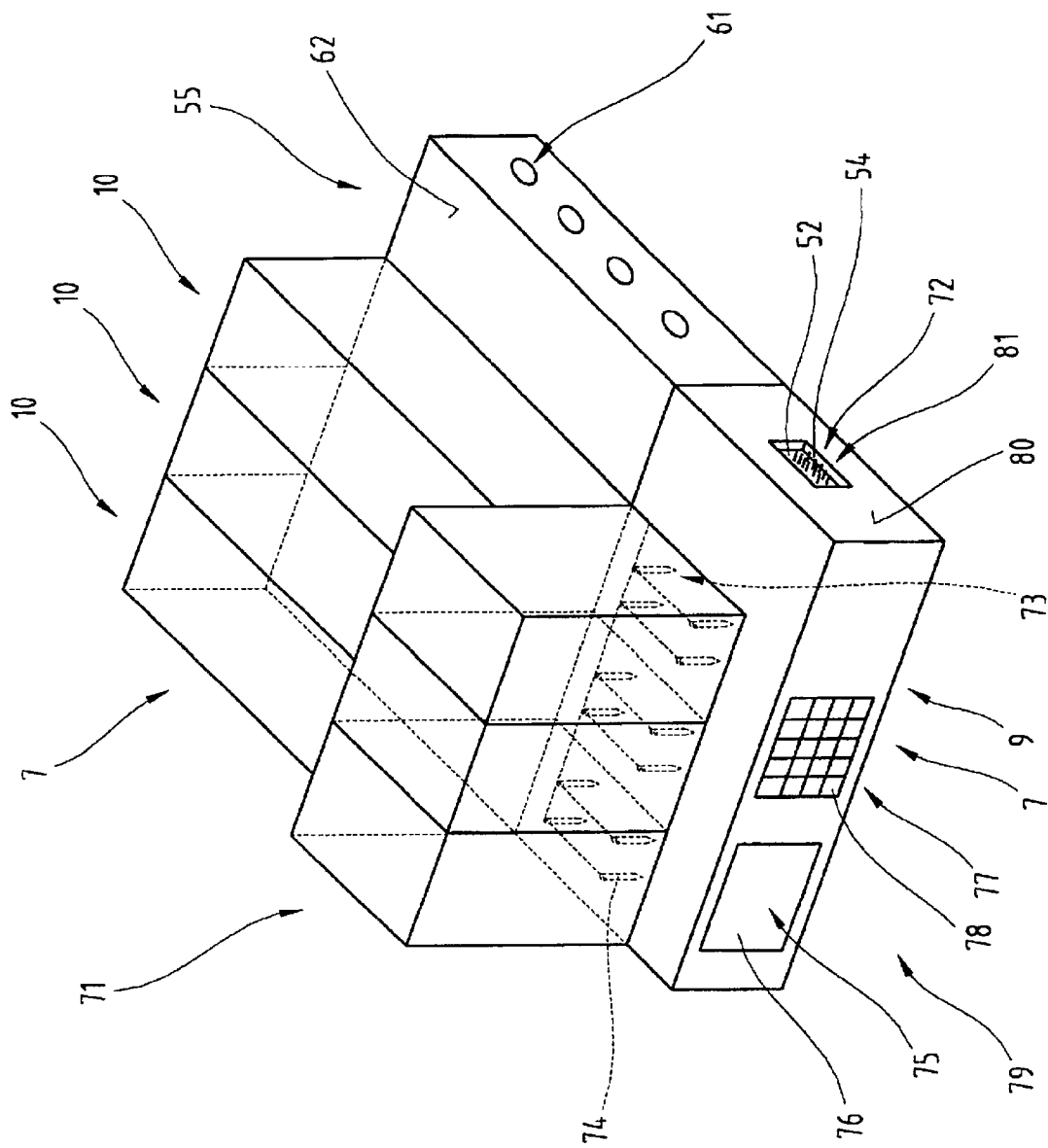
FIG. 3 a section of the displacement unit of the invention, in particular a control unit, in perspective view.

FIG. 3 shows another embodiment of the control unit 7 in perspective view. The latter comprises—as described for FIG. 2 —a pneumatic distribution bar 55 which comprises channels 61 and on the upper side 62 of which several pressure fluid control valves 10 are arranged. The pressure fluid control valves 10 comprise drives 71 which are connected detachably or non-detachably with the pressure fluid control valves 10 and with an electric distribution bus bar 72 preferably by plugs 74 designed as coupling devices 73. In the present embodiment the electric distribution bus bar 72 is a part of the control unit 7. It is however also possible to form a flexible connection between the electric distribution bus bars 72 and the control unit 7. Also the electric distribution bus bar 72 should not only be understood to be a rigid line connection, but can also be formed by flexible single lines preferably running into a housing.

The control unit 7, in particular the control module 9 comprises in the present embodiment at least one display element 75, which is designed for example as a display 76 with text, number display, light-emitting diodes and/or acoustic information elements. In addition, the control unit 7 comprises an input device 77, preferably in the form of a keyboard 78. The latter can however also be formed by a touch screen which combines the input device 77 with the display 76. The display element 75 together with the input device 77 forms an input and output device 79. The electric distribution bus bars 72 and the control unit 7 comprise on an end side face 80 a multipoint plug 81 designed as an input 52 and output 54. It is also possible to use the bus connector plug 53 described in FIG. 1.

Figure 4:
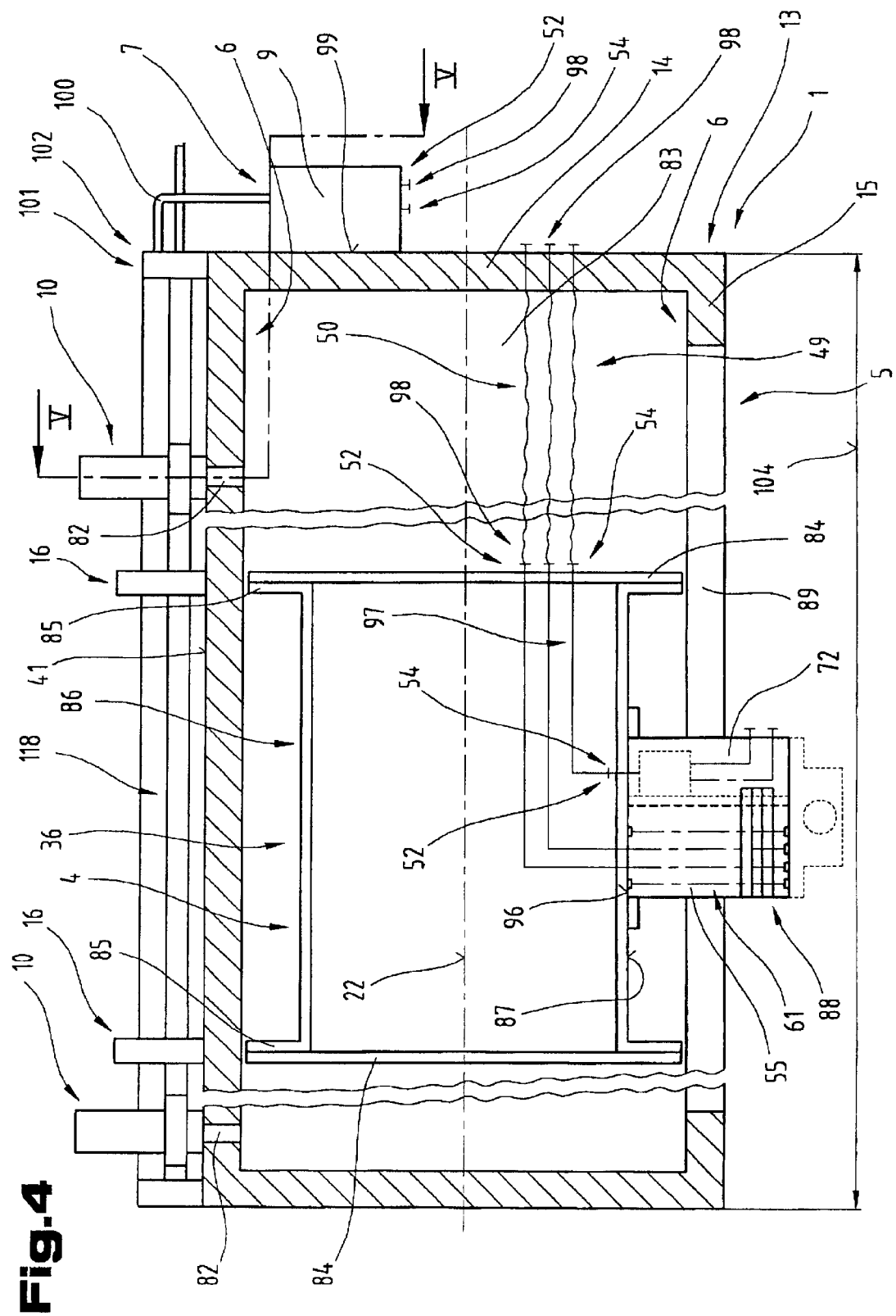
FIG. 4 a further embodiment of the displacement unit of the invention, in cross section, in plan view.
Figure 5:
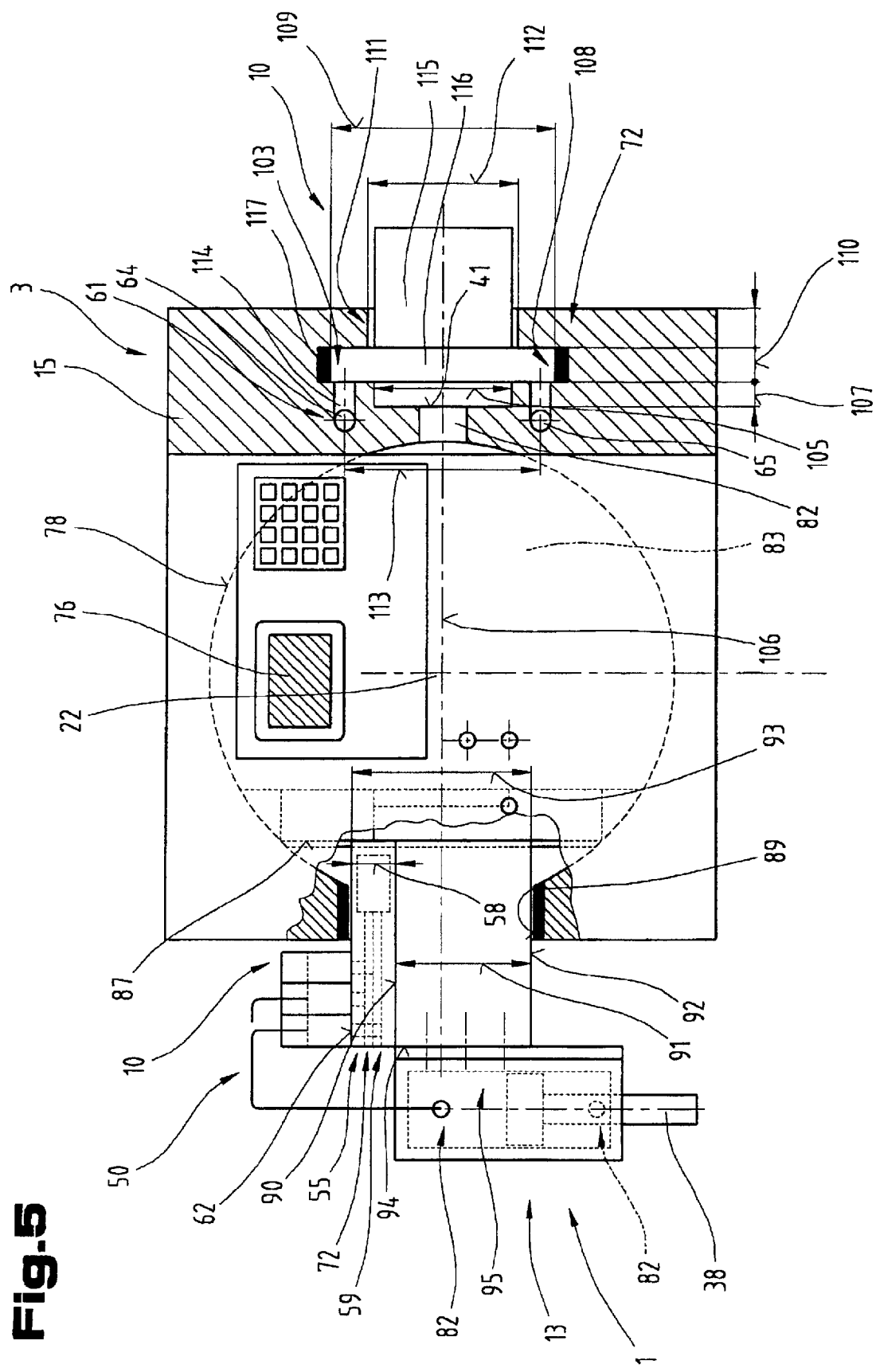
FIG. 5 the displacement unit of the invention, in cross section, along the lines V—V of FIG. 4.

In the jointly described FIGS. 4 and 5 a further embodiment of a displacement unit 1 according to the invention is shown. The latter comprises the drive unit 5, which in the present embodiment is designed as a pneumatic cylinder 13 without a piston rod. The pneumatic cylinder 13 without a piston rod in turn comprises a cylindrical pipe 15, which has connection openings 82 which project from the outer surface 41 of the cylindrical pipe 15 up to a cylinder inner chamber 83. The cylindrical pipe 15 is used in turn as a guiding device 6 for the piston 36. This is hollow and comprises two parallel piston plates 84 at right angles to the central axis 22, which are connected detachably or non-detachably to flanges 85 running parallel thereto.

The flanges 85 are a component of a piston body 86, which has a rectangular cross section in a plane perpendicular to the central axis 22. The flanges 85 and the piston plates 84 are adjusted in outline to the cross section of the cylindrical inner chamber 83 and are circular and concentric to the central axis 22. An outer surface 87 delimiting the piston body 86 and parallel to the central axis 22 is used for mounting a slide 88 which passes through a slot-shaped longitudinal opening 89 arranged in the cylindrical pipe 15. The slide 88 comprises a pneumatic distribution bar 55, which is secured detachably or non-detachably to an upper side 90 of the slide 88 perpendicular to the outer surface 87. The slide 88 has a height 91 measured parallel to the outer surface 87 which spaces the upper side 90 from an underside 92 of the slide 88 parallel thereto. The slot height 93 of the longitudinal opening 89 measured parallel to the slide height 91 is greater than the slide height 91 plus the bar height 58 of the pneumatic distribution bar 55. On the upper side 62 of the distribution bar 55 and the electric distribution bus bars 72, which can also be arranged on the upper side 90 of the slide 88, are the pressure fluid control valves 10. From the pressure fluid control valves 10 run lines 50 to connection openings 82 of an additional displacement unit 1, which is also designed as a pneumatic cylinder 13, but with a piston rod 38.

The slide 88 is delimited in opposite direction to the outer surface 87 of the piston body 86, which is component 4 by an end face 94, which has a mechanical interface 95 for additional displacement units 1 or assembly and processing devices or for power or for control units 7. In place of lines 50 said mechanical interface 95 can be designed so that the end face 94 or the end face 59 of the pneumatic distribution bar 55 comprises not shown openings which correspond with also not shown openings in the other displacement unit 1. It is also possible instead of a separate pneumatic distribution bar 55 to design the slide 88 to have integrated channels 61.

On an inner end face 96 of the slide 88 and the pneumatic distribution bar 55 running parallel to the end face 94 and opposite the latter are inputs 52 and outputs 54 which are combined in the present embodiment in the form of a bus line 97. It is also possible however, instead of the bus line 97 to use a multipoint line or single lines. The bus line 97 can be flexible or rigid and runs as far as the piston plate 84 which faces the control unit 7 for the pneumatic cylinder 13 without a piston rod. In said piston plate 84 there are inputs 52 and outputs 54 which are designed as coupling devices 98. From said coupling devices 98 up to the adjacent closing element 14 of the pneumatic cylinder 13 without a piston rod extend one or more control lines 49 and one or more lines 50 which are designed to be adjustable in length for example in the form of a spiral.

On an outer surface 99 of the closing element 14 facing away from the piston 36 are coupling devices 98, which are allocated to the control lines 49 and lines 50.

The control unit 7 is also arranged on the outer surface 99. The latter comprises a display 76 and a keyboard 78. The control unit 7, in particular the control module 9 has inputs 52 and outputs 54, which also can be designed as coupling devices 98 and are used for the transmission of signals and commands for example to a central control unit. This transmission is, however, not necessarily possible only by means of lines 50 or control lines 49, but can also be performed, for example, optically by means of lasers or by means of infrared or ultrasound. From the control module 9 extends an ASIC bus line 100 for example, which supplies the pressure fluid control valves 10 or the signalling and monitoring members 16 with power or data or conveys data from the latter. The ASIC bus line 100 is preferably bipolar. Via an interface 101 and an evaluation unit 102 the signals and commands originating from the control module 9 or the central control unit and transmitted by the ASIC bus line 100 are transmitted to an electric distribution bus bar 72 which is arranged in a guiding device 103.

The guiding device 103 is preferably arranged in the cylindrical pipe 15 and extends at least over a portion of a length 104 of the drive unit 5. It is thus designed so that it projects groove-like over the outer surface 41 of the cylindrical pipe 15 in opposite direction to the piston 36. In the region of the outer surface 41 it has a slot width 105, which is arranged symmetrically about a central plane 106 running through the central axis 22. At a depth 107 measured from the outer surface 41 in opposite direction to the piston 36 the guiding device 103 comprises a groove 108, which has a width 109 parallel to the slot width 105 and perpendicular to the central plane 106 which is greater than the slot width 105. The groove 108 has a height 110 measured adjoining the depth 107 in opposite direction to the piston 36. In addition to the groove height 110 the guiding device 103 also comprises a recess groove 111 which has a width 112 measured parallel to the groove width 109 that is smaller than the latter.

The cylindrical pipe 15 also comprises connection openings 82 projecting from the outer surface 41 in the direction of the inner chamber of the cylinder 83. Symmetrically about the central plane 106 and at a bore distance 113 apart, channels 61 run in the cylindrical pipe 15, in particular an air inlet channel 64 and an air outlet channel 65. From the latter connecting channels 114 extend up to the groove 108 and run at right angles to the outer surface 41.

Pressure fluid control valves 10 are inserted into the guiding device 103, which in the present embodiment are designed as valve cartridges 115. They comprise a flange 116 with contact elements 117 which are in contact with the electrical distribution bus bar 72. The electric distribution bus bar 72 which in the present embodiment is designed as a conductor can, however, also be in the form of lines integrated into the component 3, i.e. in the cylindrical pipe 15. In addition, it is also possible for the valve cartridge 115 to have a separate control module 9, which is provided either in addition to the control module 9 arranged on the closing element 14 or replaces the latter.

The guiding device 103 also forms a bar-shaped securing device 118 for the signalling and monitoring members 16. These can also comprise control modules 9. It is also possible not to integrate the guiding device 103 into the drive unit 5, i.e. into the cylindrical pipe 15, but to design it as a separate component, which is secured detachably or non-detachably to the cylindrical pipe 15. In this way the guiding device 103 can comprise several connection openings arranged at prespecified distances in the direction of the length 104, at least one of which corresponds with connection openings 82 arranged in the cylindrical pipe 15. In this way it is possible to design the guiding device 103 for a modular structure of the displacement unit 1.

Figure 6:
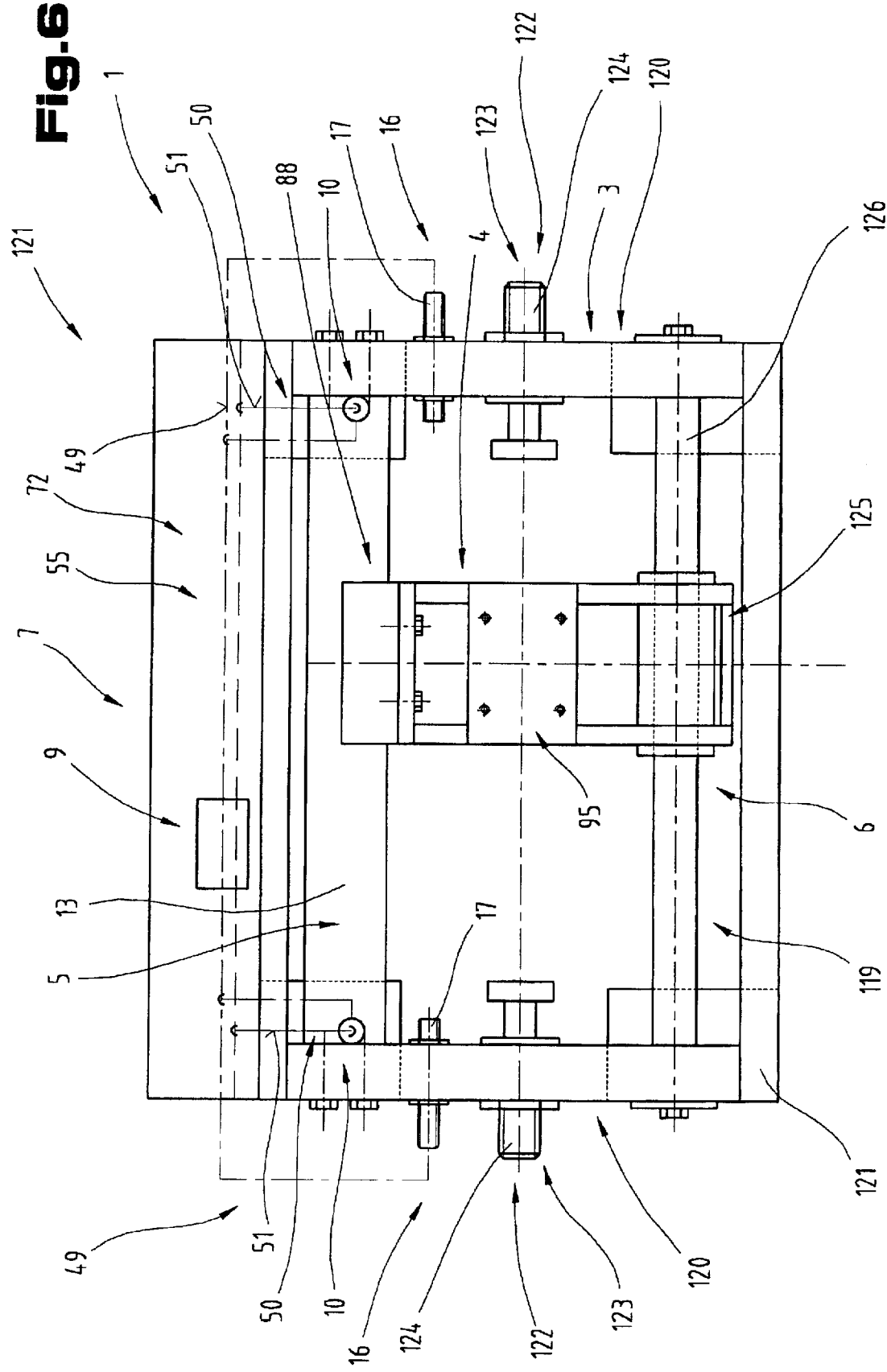
FIG. 6 a further embodiment of the displacement unit of the invention, in front elevation.

In FIG. 6 a further embodiment of a displacement unit 1 according to the invention is shown. The latter comprises components 3, 4 that are adjustable relative to one another, component 4 being arranged by means of a guiding device 6 designed as a linear guide 119 on the frame-shaped component 3. The guiding device 6 can however also be designed as a rotary or gear guide or as a sliding track. The frame-shaped component 3 has two parallel connecting elements 120, which are spaced apart by longitudinal elements 121 running at right angles and parallel to one another. The connecting elements 120 are used for mounting securing devices 122 which are formed by a damping device 123, in particular a shock absorber 124. In this way the component 4 is restricted in at least one direction of movement on the component 3. Signalling and monitoring members 16 are also arranged in the connecting elements 120, which are designed for example in the form of capacitive proximity switches 17.

The guiding device 6 is designed as a ball bush guide. The component 4 has at least one ball bush 125, in which a guide shaft 126 is inserted, which is arranged securely on the component 3. One longitudinal element 121 is constituted by drive unit 5 which in the present embodiment is also designed as a pneumatic cylinder 13.

Pneumatic cylinder 13 is a linear cylinder and comprises the slide 88 on which component 4 is secured. The latter comprises in turn the interface 95, on which a not shown additional displacement unit 1 can be arranged and in the region of which also not shown inputs 52 and outputs 54 of a control unit 7 can be arranged, which can be connected by plug connections to a control unit 7 of a not shown additional displacement unit 1. Integrated into the drive unit 5 is the pneumatic distribution bar 55 and the electric distribution bus bar 72 with the control module 9. The electric distribution bus bar 72 is connected by dot-dash shown control lines 49 to signalling and monitoring members 16 and the pneumatic distribution bar 55 via lines 50, for example pneumatic pipes 51 to the pressure fluid control valves 10.

Figure 7:
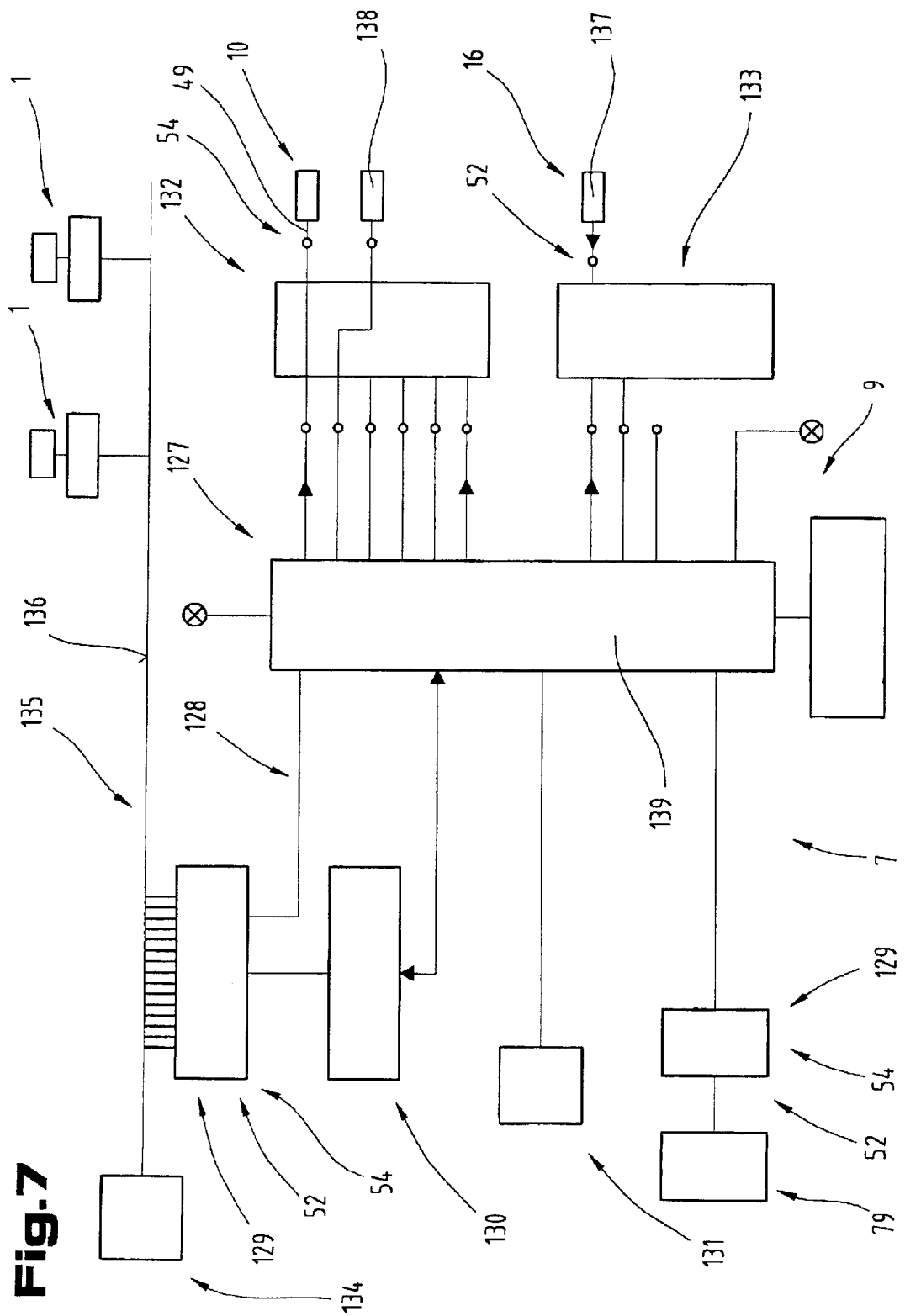
FIG. 7 a block diagram of a control unit of the displacement unit of the invention.
Figure 8:
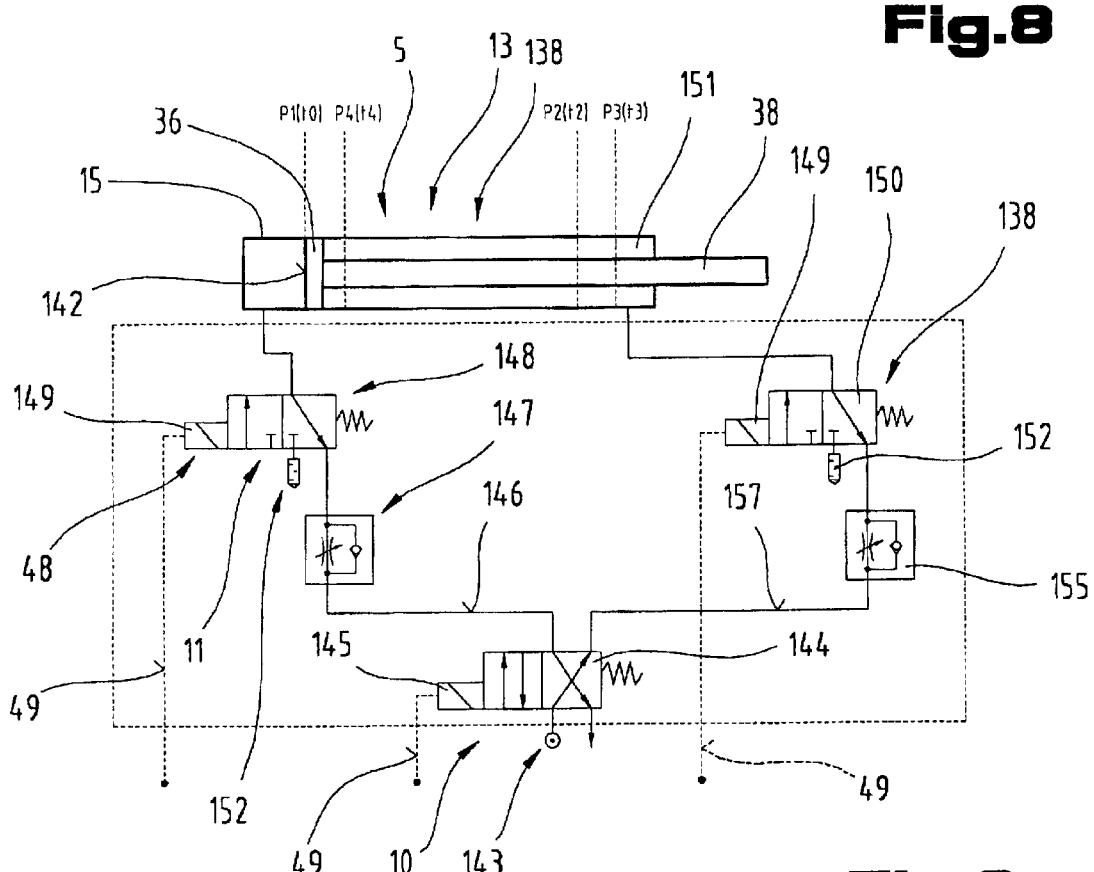
FIG. 8 a circuit diagram of the control unit of the displacement unit of the invention.
Figure 9:
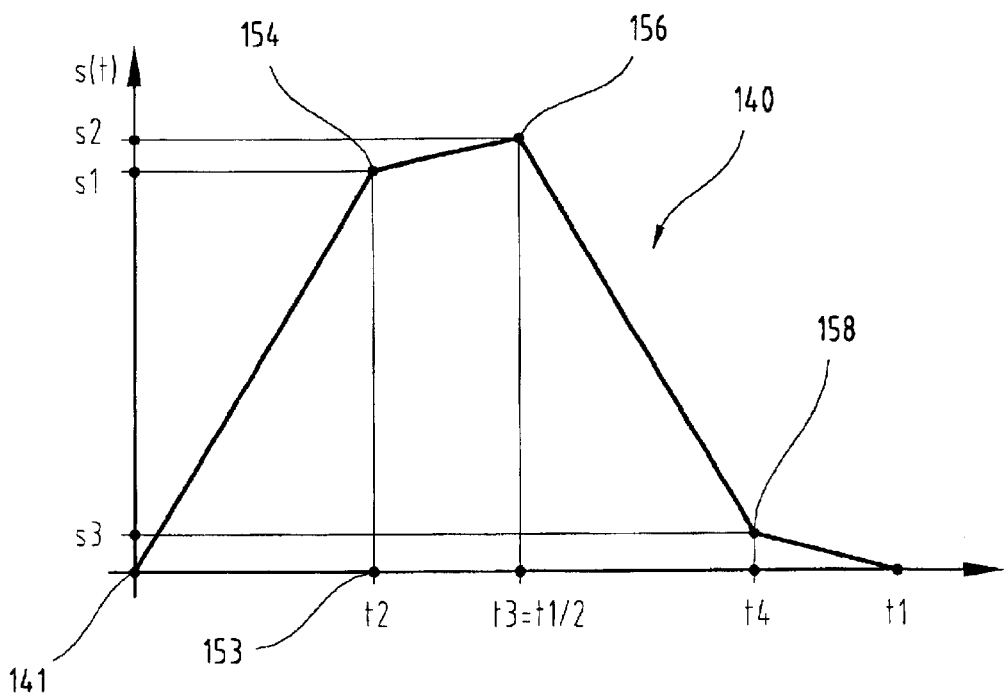
FIG. 9 a time-motion diagram of the displacement unit of the invention.

As shown in the jointly described FIGS. 7 to 9, the control module 9 is a microprocessor 127, which is connected by conductors 128 forming control lines 49 to an interface 129 forming an input 52 and output 54. The latter comprises an integrated or, as shown, an external evaluation unit 130 which is also connected to the microprocessor 127. In addition, a memory 131 for saving individual movements, and an input 52 and output 54 designed as an external interface 129 for external input and output devices 79 are connected to the microprocessor 127. In addition the microprocessor 127 is also connected to a driver 132 which is arranged between outputs 54 and the microprocessor 127 and to a DIA converter 133 which is arranged between inputs 52 for signaling and monitoring members 16 and the microprocessor 127. The microprocessor 127 is designed so that it detects one or more of the following functions in parallel or in series:

initiating mode control mode learning mode monitoring mode

Of course, it is possible to provide a separate microprocessor 127 for each of these functions to perform these functions using a conventional control or perform them in a central control unit 134.

The initiating mode is used so that on forming the connection between the control module 9 and a central control unit 134, the basic parameters of the control module 9 of the displacement unit 1 are transmitted. The latter can for example be transmitted in the form of a program which makes the potential reference values of the displacement units 1, in particular the pneumatic cylinder 13, appear on an external input and output device 79 or on a screen of the central control unit 134. Said potential reference values, such as displacements in x and y direction, speeds and forces can therefore be stored in the memory 131. The operator can now determine the actual, i.e. current reference values, for example the displacement, the acceleration, and the deceleration of the piston 36 of the pneumatic cylinder 13, according to the individual movement situation. This can be performed for example in such a way that by means of the input and output device 79 or by means of the central control unit 134, the potential reference values can be shown as variables, which can be provided by the operator with the corresponding current reference values. If the current reference value entered by the operator exceeds the stored potential reference value, a warning can be sent to the operator for example.

Such an initiation of a displacement unit 1 can however also be performed by means of a data glove and simulation of the displacement unit 1 directly at the control module 9. In this case the operator with the data glove executes the movement to be performed directly in the relevant assembly station. The displacement unit 1 performs these movements of the data glove preferably simultaneously and transmits the values detected by signalling and monitoring members 16, for example x and y components, to the microprocessor 127 and/or to the control unit 134. The data glove is coupled by inputs 52 and outputs 54 to the control unit 7 and/or the control unit 134, and the movement data is conveyed to the latter. The latter calculate from this a function of the movement and store it as a program. In particular by using a data glove as an input and output device 79 the expense of programming can be considerably reduced and the displacement unit 1 can be used variably. The x and y components can however also be detected by a local positioning system similar to the GPS. Thus for example when producing not shown different assembly parts 2 on an assembly device for each individual assembly part 2 and each individual displacement unit 1 a corresponding program can be developed rapidly and saved. The input and output device 79 can however also be designed as a keyboard, a reading device for chipcards, magnetic cards, CDs, diskettes or tapes.

The other control modules 9 of displacement units 1 can be initiated in the same way. On using a bus line system the control module 9 following the already initiated control module 9 can be connected to the former via the not shown bus line 97. In this case the potential reference values are sent to the central control unit 134 avoiding the preceding control module 9. The operator can now also determine the actual reference values for this additional control module 9, which can be stored in the control unit 134 or in the memory 131 as data or in program form. In this manner for each individual control module 9 the corresponding handling program can be provided.

As however in many cases the activation of a control module 9 can be dependent on the handling parameter of another control module 9, it is also necessary to connect the individual handling programs of the control modules 9. This can be performed by means of the control unit 134 or the control modules 9 themselves. For this purpose for example after the initiation of a control module 9, i.e. after determining the current reference values, the latter can ask in a dialogue with the operator "start signal?" This start signal is a freely definable variable used by the operator. The operator can use a signal of a different displacement unit 1 in that this other displacement unit 1, i.e. the other control module 9, creates a monitoring signal, which is sent from the signalling and monitoring members 16 of this other displacement unit 1 via the D/A converter 133, and via the interface 129 as a data bus addressed to the displacement unit 1 needing the start signal, which data bus is used in the variable "start signal?". A connection of this kind of various control modules 9, i.e. various displacement units 1, can also be performed however via the input and output device 79 of a control module 9.

The control mode is carried out as follows.

The interface 129 is connected to a central connection line 135, which is designed as a serial or parallel bus line 136 and leads to at least one control unit 134 and additional displacement units 1. From the control unit 134 or from one or more additional control modules 9 the interface 129 receives one or more data sets provided with an address. In the evaluation unit 130 a comparison of these addresses is made with the address of the control module 9. When the addresses coincide, the control module 9 is supplied with the transmitted data set. A data set of this kind can in the present example merely be a starting pulse for the control module 9 and thus for the displacement unit 1 concerned, which is transmitted for example from a control module 9 of a different displacement unit 1, which has completed its tasks.

In this case, as already described above, the operator by means of the control unit 134 or an external input and output device 79 can instruct the microprocessor 127 of the control module 9 of this other displacement unit 1, to enter a signal received by a signalling and monitoring member 16, for example a position of the pneumatic cylinder 13 via the interface 129 to a control module 9 of a displacement unit 1 addressed into the bus line 136. This signal reaches the interface 129 of the control module 9 of the displacement unit 1 and is fed into the microprocessor 127 of this control module 9 where it is used as a starting pulse for the program for this displacement unit 1 determined by the operator after the initiation mode in the memory 131 of the control module 9 or in the central control unit 134.

With the arrival of the start pulse in the microprocessor 127 its program begins to run. In this case by means of the driver 132, if there is one, one or more pressure fluid control valves 10 are charged by one or more control lines 49, so that current flows through a coil designed as a drive 48 of the pressure fluid control valves 10 and a valve body is moved by means of magnetic force. In this way, for example by means of the connection opening 82 of the pneumatic cylinder 13 shown in FIG. 4, the latter is charged with compressed air and operates for example at constant speed. It is also possible however instead of conventional pneumatic valves 11 to use servovalves and thus vary the speed of the piston 36.

If the piston 36 now reaches a position which can be detected by means of the signalling and monitoring member 16 shown in FIG. 4 or prespecified in the program of the microprocessor 127, a pulse arrives via a control line 49 to the microprocessor 127, which sends a corresponding signal to the pressure fluid control valve 10, i.e. to the drive 48 of a pneumatic valve 11, and ends the air supply to the pneumatic cylinder 13 and stops its movement. The evaluation of sensors 137 designed as signalling and monitoring members 16 can also be performed in the control unit 134 and the drive or charging of individual actuators 138 of a displacement unit 1 can be performed directly via the central bus line 136. In addition, the switching and control procedures should not be understood to be restrictive and only represent a simple example of a control module 9. Furthermore, data can be transmitted between the control unit 7 and control unit 134 or from the individual components of the control unit 7 to the latter optically by means of lasers or by means of infrared or ultrasound.

As already explained, the control module 9 also has a learning mode. In this case, as already shown in the control mode, for example a position to be reached by the piston 36, i.e. a reference value in the program of the microprocessor 127 designed as logic element 139 is predetermined and detected for example by means of a measuring member, in particular a displacement measuring device.

Once the piston 36 reaches this position the corresponding pulse of a displacement measuring device forming signalling and monitoring member 16 is evaluated in the microprocessor 127, and the required pulse is sent to the pressure fluid control valve 10, which stops the supply of power to the drive unit 5. Due to the kinematic energy of the piston 36 however, despite ending the air supply, the piston 36 may move beyond the given position, which can affect the precision of positioning the displacement unit 1.

By means of the displacement measuring device the actual position, i.e. the actual value of the stopped piston 36 is detected, and sent to the microprocessor 127 or the central control unit 134, where the actual value is compared with the reference value and the difference between the reference position and the actual position of the piston 36 is determined. After determining the difference, the microprocessor 127 sends a pulse for opening a pressure fluid control valve 10, whereby the piston 36 is moved back by the difference, and thus the exact position is reached, i.e. the actual value is adjusted to the reference value. This difference is also used for the next displacement cycle, in order to actuate the pressure fluid control valve 10 not just when reaching the reference position, but earlier by the calculated difference. This means that the actual value is defined as the reference value which represents an optimized time value for example with respect to cycle time, wear, vibration etc. A learning mode of this kind is advantageous in particular for increasing the acceleration of the piston 36 and a corresponding damping, i.e. slowing down of the piston 36. The advantage of such a learning function is in particular that, on using servovalves, the pistons 36 of the pneumatic cylinder 13 are accelerated or slowed down, and in this way there is a change in the kinematic energy of the piston, which makes the deceleration of the piston to an exact position more difficult.

A further example of the learning mode can on using corresponding sensors 137, in particular microsensors, reduce the stress on and thereby the wear of the displacement unit. Thus for example, as shown in FIG. 1, a vibration sensor designed as a signalling and monitoring member 16 can be provided on upper side 31 at tool carrier 20, which transmits its data wirelessly or by line to the control module 9 or to the control unit 134. A vibration sensor or force sensor can also be arranged on the displacement unit 1 for example on component 3 and/or component 4.

If for example after the initiating mode the first cycle of the displacement unit 1 is performed and as shown in FIG. 1, a gripper with an assembly part 2 drives too "hard" on mount 32 for the assembly part 2, the vibration sensor transmits the value of the vibration to the control module 9 or the control unit 134. The latter evaluate the measurement value and, on exceeding a specific predeterminable target value, for example by means of calculating algorithms such as fuzzy logic, neuronal networks or genetic algorithms, calculate a new end position of the gripper, which on reaching the assembly part 2 is no longer placed "so hard" into the mount, which is achieved preferably by the end position damping described below. The relative number of cycles between two consecutive adjustments of the positions of the components 3, 4 can be used to determine a maintenance plan. In this way it is possible on the basis of the predeterminable reference value to determine an optimum drive curve of the displacement unit 1 and to control the pressure fluid control valves 10 accordingly.

It is also possible however to detect wear by measuring pressure and thus establish maintenance prognoses. Thus for example, on initiation, the pressure in the air inlet line of the pneumatic cylinder 13 is determined by a pressure sensor and stored in the memory 131. The actual pressures are detected cyclically. Due to wear, for example in the region of the piston 36 and the cylindrical pipe 15, or the linear guide 119 designed as a guiding device 6 illustrated in FIG. 6, the sliding friction is reduced, which results in a reduction of frictional forces and thereby directly to a reduction in pressure. This drop in pressure thus signals the degree of wear of the elements concerned, and can, as already described, be used as parameters for the modes of the displacement unit 1.

By means of the monitoring mode an exact maintenance and up-keeping of the displacement unit 1 can be performed. The microprocessor 127 counts for example the absolute number of performed cycles and the relative cycle number between two consecutive corrections of the parameters on the basis of the learning mode. If the relative cycle number drops so far that it falls below a predeterminable minimum cycle number, the microprocessor 127 sends a repair signal either directly to the control unit 134 or via the external interface 129 to external input and output devices 79. The repair signal is set in a relation to the absolute cycle number and a maintenance plan for the future can be developed therefrom.

Of course, the wear can also be determined directly for example by surface roughness measurements and/or by continual measuring of the objects, for example the piston 36 or the sealing rings. Mainly in the control and learning mode, specific displacement modes for the displacement unit 1 such as a for example "normal drive", "slow drive" or "rapid drive" can be predetermined by positioning paths and speed profiles 140.

The functions of the displacement unit 1 are now explained with reference to a control shown in FIG. 8 for variable speeds and end position damping of a piston 36 in a predeterminable position.

The starting point here is the available displacement time of a displacement unit 1 resulting from the cycle time of an assembly system, in particular a double acting pneumatic cylinder 13. The latter should be 70 ms, for example. As illustrated better in FIG. 9 the speed profile 140 is formed therefrom. The pneumatic cylinder 13 is charged with compressed air on one side 142 at the time point or at position 141. The compressed air comes from a compressed air supply 143, which is connected to an electrically operated 4/2 valve 144 serving as pressure fluid control valve 10. The electrically operated 4/2-way-valve 144, i.e. the drive 145 designed as a coil, is connected by a control line 49 and the driver 132 to the microprocessor 127, which via the interface 129, the evaluation unit 130 and the bus line 136 receives the starting signal from the control unit 134 or a control module 9 of a different displacement unit 1.

By means of this starting signal, the 4/2-way-valve 144 is actuated and a line 146 put under pressure. A restrictor return valve 147 designed as a pressure fluid control valve 10 is released in flow direction to the pneumatic cylinder 13 and the compressed air reaches an electrically operated 3/2-way-valve 148 unrestrictedly. A drive 149 of this valve is connected by a separate control line 49 or via the control line 49 of the 4/2-way-valve 144 to the microprocessor 127 and is inactivated on the advance of the piston 36, so that a free passage of the compressed air is provided to side 142.

At the same time (as the time point or position 141) with the starting pulse at the 4/2-way-valve 144 a pulse is sent via a control line 49 to a further 3/2-way-valve 150, for example just by microprocessor 127 and not by the control unit 134, which is connected to the side 151 of the pneumatic cylinder 13 and in this activated state the side 151 is completely vented by means of a sound damper 152. The piston 36 can now be accelerated with full pressure on side 142 and at a given time point 153 in the microprocessor 127 or in the control unit 134 reaches position 154. At time point 153 the pulse from the microprocessor 127 to the additional 3/2-way-valve 150 is switched off, whereby the latter is moved back, for example by spring force, into its position of rest and the venting of compressed air from the side 151 is performed no longer by sound damper 152 but by counter pressure by a further restrictor return valve 155, as a result of which the piston speed is reduced until position 156 is reached.

At position 156 either a holding time begins not shown in FIG. 9, during which an additional displacement unit 1 arranged for example on the piston rod 38, completes its task, or the return motion of the piston 36 is performed. For this the pulse on the drive 145 of the 4/2-way-valve 144 is removed, whereby the latter adopts a position of rest due to the spring force. In the latter the air flows into a line 157 in the direction of side 151. Air freely flows through throttle return valve 155 in the direction of the second 3/2-way-valve 150, the drive 149 of which is not actuated and thus compressed air reaches the side 151.

At the same time at position 156 a pulse is sent by the microprocessor 127 to the drive 149 of the first 3/2-way-valve 148 and activates the latter, as a result of which the side 142 is completely vented by a sound damper 152. The piston 36 now moves at maximum speed from position 156 to position 158. On reaching position 158 the pulse, i.e. the voltage on the drive 149 of the first 3/2-way-valve 148 is removed, as a result of which the latter is returned by spring force into its position of rest, and frees the path in the direction of the first throttle return valve 147, whereby the compressed air emerging from side 142 is throttled and the piston 36 is braked. Both in position 141 and in position 156—as shown in FIG. 6—securing devices 122 for example in the form of switchable end stops can be arranged, which themselves can act as signalling and monitoring members 16 or comprise additional signalling and monitoring members 16. If one is arranged at position 141, for example a pulse is sent via a separate control line 49 or a central connecting line 135 to the microprocessor 127, which conveys this signal via the evaluation unit 130 and the interface 129 to the control unit 134 and processes its into a pulse, in which it ends the program stored in the memory 131.

Of course, instead of the time control there can be a displacement measurement in the drive unit 5 and according to predeterniinable positions the described pulses can be generated and distributed. The pressure fluid control valves 10, i.e. the 4/2-way-valve 144, the 3/2-way-valves 148, 150 and the throttle return valves 147, 155 are only examples, and can of course be substituted and/or supplemented according to different control functions by different pressure fluid control valves 10.

One problem with the individual modes is creating a reference parameter which forms the starting point for joining the individual control modules 9 of displacement units 1. A reference parameter of this kind can for example be the speed of a pneumatic cylinder 13 and thus the cycle time of a displacement unit 1. In this case after the initiating mode the cycle time of each individual displacement unit 1 can be determined and sent into the central. control unit 134. There a comparison of all cycle times of the displacement units 1 is performed and the "slowest" displacement unit 1 is determined, i.e. the greatest pulse time of the displacement unit 1 is established. To this cycle time the cycle times of the other displacement units 1 are adjusted for example by means of the learning mode.

Figure 10:
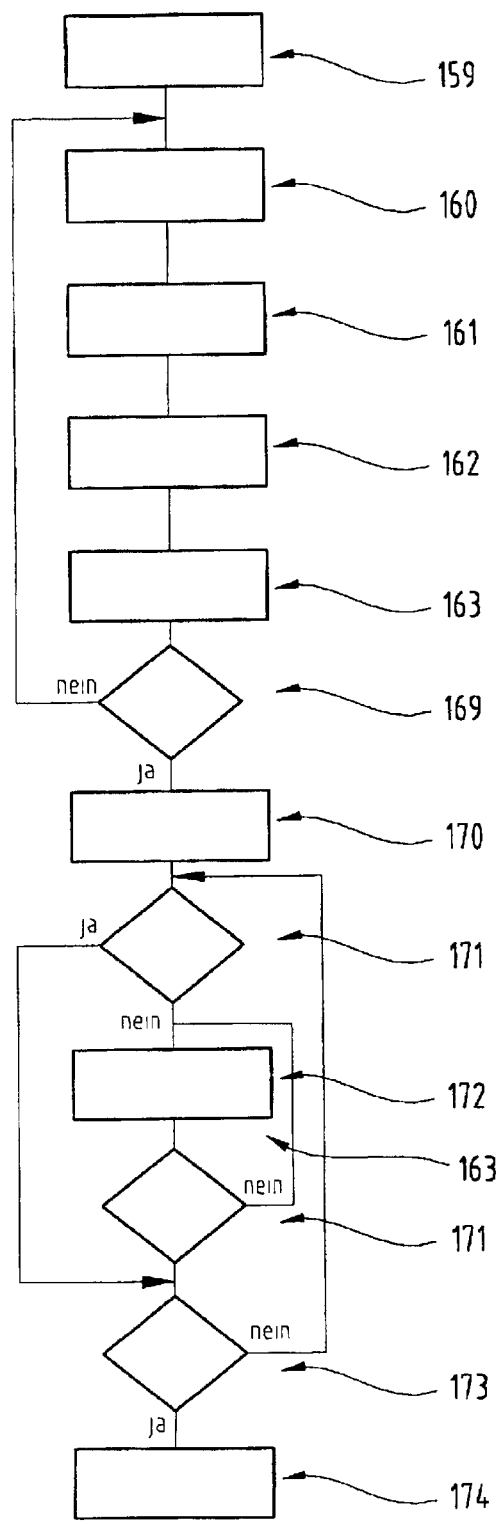
FIG. 10 a flowchart of the method of the invention for operating the displacement unit according to the invention.
Figure 11:
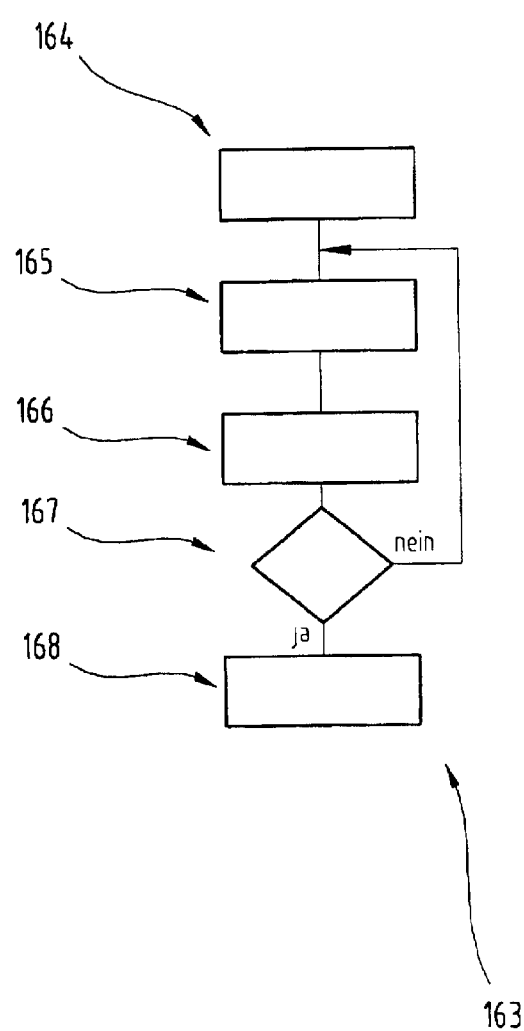
FIG. 11 a flowchart of the method for operating the displacement unit of the invention.

In the jointly described FIGS. 10 and 11 the sequence of the initiating mode is shown in combination with the learning mode for optimising reference valves with respect to the cycle time. if an assembly system is to be composed of several not shown displacement units 1, method step 159 is commenced. In the latter there is a selection of a physical target variable in the central control unit 134 shown in FIG. 7 or in the control module 9 to be optimized from a specific number of such physical target variables. The latter can for example be the maximum speed, the minimum impactor the necessary speed. The necessary speed of a displacement unit 1 is oriented to each displacement unit 1 which takes the greatest time for a specific assembly step to be performed thereby for procedural reasons. As this slowest displacement unit 1 determines the cycle time of the entire assembly system, it is not necessary that other displacement units 1, which are "faster" than the "slowest" displacement unit 1 perform the assembly steps to be performed thereby in their minimum possible individual cycle time.

If the individual cycle times, i.e. the individual speeds of the various displacement units 1 are adjusted to those of the "slowest" displacement unit 1, unnecessary wear can be avoided in the potentially faster displacement units 1. After method step 159, sequence 160 is performed. In the latter the connection between the central control unit 134 and the first control module 9 of the first displacement unit 1 is formed by means of the bus line 136. After this, procedure 161 is performed. In the latter the potential reference values of the displacement unit 1 determined in the control module 9 especially in the memory 131, for example maximum displacements in x and y direction, are sent to the central control unit 134 automatically by producing the connection in sequence 160. After this follows method step 162, in which the actual reference values of the control module 9 of the displacement unit 1 adjusted to the corresponding assembly situation of the displacement unit 1 are pregiven at the central control unit 134 or at an external input and output device 79. Once the method step 162 has been completed, sequence 163 is performed which is formed by the learning mode.

The latter is illustrated in more detail in FIG. 11. The learning mode begins with procedure 164, in which the control module 9 programmed with reference values is started manually and externally, followed by method step 165. In the latter the pressure fluid control valves 10 of the displacement unit 1 are actuated according to the entered actual reference values. Once the pressure fluid control valves 10 have ended their prespecified sequences and thus the displacement unit 1 has reached its reference position according to the reference values, in sequence 166 the actual values are detected, i.e. the actual positions of the components 3, 4 of the displacement unit 1. Afterwards in procedure 167 a comparison of the detected actual values with the entered reference value is made and where there is insufficient correspondence there is a return to the beginning of method step 165 and thus a further actuation of the pressure fluid control valves 10 and a change of position of the components 3, 4 of the displacement unit 1 is performed. If the reference-actual value comparison is successful in procedure 167, i.e. the actual values correspond with the reference values, the actual target variable of the displacement unit 1 is stored in the sequence 168. Which target variable should be stored from a possible number of actual target variables is determined by the selection made in method step 159 of the physical target variable to be optimized.

After completing the learning mode of the individual displacement units 1 in method step 169, it is queried whether the method step 159, the sequence 160, the procedure 161, the method step 162 and the sequence 163 has been performed for all control modules 9 of all displacement units 1. If this is not the case, there is a return to the beginning of sequence 160, whereby the previously described sequence is carried out for a further control module 9 of a further displacement unit 1. However, if all control modules 9 of displacement units 1 are initialed in this way or the latter have learnt their optimum settings, in procedure 170 the common target value of all displacement units 1 is detected from the amount of actual target values of individual displacement units 1 detected and stored in the sequence 163.

Said target value can for example, as already indicated, be the pulse time of the "slowest" displacement unit 1, which determines the necessary speed for all displacement units 1. In procedure 171 beginning with the first displacement unit 1, a comparison of the actual-target variable is made with the target value. If the latter do not correspond, method step 172 is performed, which is formed for example by sequence 163 i.e. by the learning mode. After completing the learning mode, i.e. after ending sequence 163, and adjusting the actual values of the displacement unit 1 to the target value procedure 171 is carried out, i.e. a comparison of the actual target variable of the first displacement unit 1 with the target value. If these two do not coincide, there is a return to the beginning of method step 172, i.e. to the learning mode. If the comparison is successful however, i.e. the latter coincide, it is queried in sequence 173 whether all actual target variables of all control modules 9 of all displacement units 1 have been compared and adjusted by means of procedure 171 with the target value.

If this is not the case there is a return to the beginning of procedure 171, where now the actual target variable of an additional displacement unit 1 is compared with the target value. If the actual target variable corresponds with the target value, which are compared in procedure 171, the process continues to the beginning of sequence 173. However, if in sequence 173 it is found that all actual target variables of control modules 9 of all displacement units 1 have been compared with the target value, procedure 174 is commenced, i.e. the control mode or the monitoring mode commences for example and the assembly system is started.

It should also be mentioned that method steps 159, 162, 165, 169, 172 and/or sequences 160, 163, 168, 170 and/or procedures 161, 164, 167, 170 can be preset in the central control unit 134 and in an individual control module 9 of a displacement unit 1 or in several control modules 9 of several displacement units 1.

Figure 12:
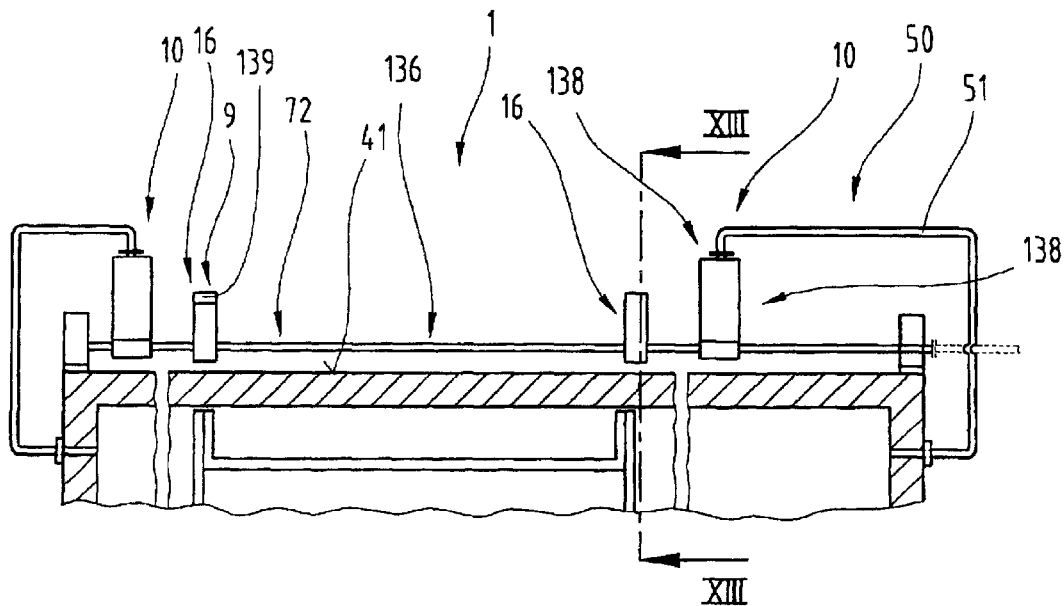
FIG. 12 a further embodiment of the displacement unit according to the invention, in cross section, in plan view.
Figure 13:
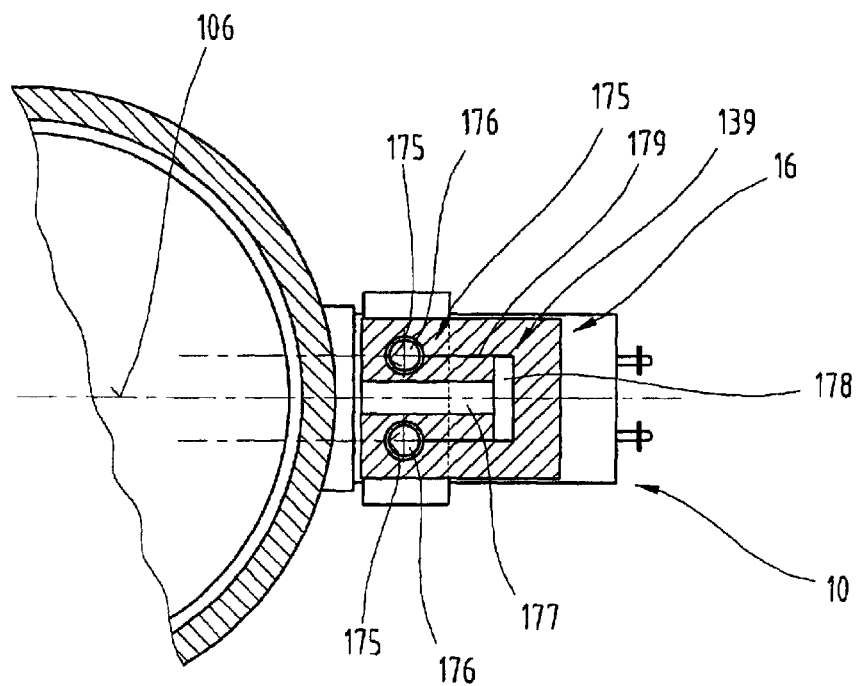
FIG. 13 the displacement unit of the invention, in cross section along the lines XIII—XIII of FIG. 12.

In the jointly described FIGS. 12 and 13 a further embodiment of the displacement unit 1 according to the invention is shown. The latter is basically the same as the displacement unit 1 shown in FIGS. 4 and 5. The displacement unit 1 comprises adjacent to the outer surface 41 signalling and monitoring members 16 and pressure fluid control valves 10. The signalling and monitoring members 16, which can have separate control modules 9 and logic elements 139, preferably have contacting openings 175 arranged symmetrically about the central plane 106, which forms a line connection to a bus line 136, comprising two individual conductors 176, which forms the electric distribution bus bar 72. The bus line 136 can however also be designed as a 3-conductor system, one conductor of which is designed as an emergency off conductor by means of which the power supply of all actuators 138 is interrupted. In this case the signalling and monitoring member 16 comprises an initiator element 177, an electronic module 178 forming logic element 139 connecting the latter and connecting lines 179 from the electronic module 178 to the contacting openings 175 via which the received signals are transmitted from the initiator element 177 to the bus line 136.

The pressure fluid control valves 10 also have the contacting openings 175 by which the latter are supplied with power via the bus line 136. The bus line 136 has a circular cross section, whereby it is possible to change both the pressure fluid control valves 10 and the signalling and monitoring members 16 in their position along the displacement unit 1. It is also possible however to integrate the bus line 136 into lines 50, in particular into a pneumatic pipe 51 for the pressure fluid control valves 10.

Finally, it should be noted that individual parts have been enlarged disproportionately in the drawings in order to improve understanding of the invention. Furthermore, individual parts of the previously described combinations of the individual embodiments can be combined with other individual features from other embodiments.

What is claimed is:

1. A displacement unit for a manipulation system, which comprises
   (a) components which are adjustable relative to each other,
   (b) a drive actuated by pressure fluid for adjusting the components, the drive having
      (1) an outer surface,
   (c) a guiding device for one of the components,
   (d) a control unit mounted on the outer surface of the drive, the control unit having
      (1) at least one pressure fluid control valve connected to the drive for actuating the drive by the pressure fluid,
      (2) a control module cooperating with the at least one pressure fluid control valve and comprising a logic unit which processes logic and bus information in order to determine and monitor the position of a respective one of the adjustable components and displacement parameters of the displacement unit, the control module being connectable to a central control unit by an interface, and the at least one pressure fluid control valve and the control module being mounted directly on the outer surface of the drive,
      (3) a display element,
   (e) at least one first signaling and monitoring element for detecting the position of the adjustable component during the operation of the displacement unit, the at least one first signaling and monitoring element being disposed in the component; and
   (f) at least one second signaling and monitoring element for detecting and monitoring displacement parameters during the operation of the displacement unit, and both first and second signaling and monitoring elements being connected to the control unit or central control unit for transmitting actual values of position and displacement parameter to the control unit or central control unit.

2. Displacement unit according to claim 1, wherein said at least one first signaling and monitoring element is a limit switch, a proximity switch, a displacement measuring system, or a position detection system.

3. Displacement unit according to claim 1, wherein said at least one first signaling and monitoring element comprises said control module.

4. Displacement unit according to claim 1, wherein at least one of said components comprises at least one fixing device for said at least one signaling and monitoring element.

5. Displacement unit according to claim 1, wherein said at least one pressure fluid control valve is a servo valve.

6. Displacement unit according to claim 1, wherein said drive comprises at least one transmission element connected with one of the said components.

7. Displacement unit according to claim 1, wherein said at least one pressure fluid control valve comprises said control module.

8. Displacement unit according to claim 1, wherein a first one of said components is arranged to move relatively to a frame-shaped second one of said components so as to be relatively displaceable by means of said drive.

9. Displacement unit according to claim 1, comprising wireless means for transmitting data from said control unit to said central control unit.

10. Displacement unit according to claim 1, comprising a data glove connected by inputs and outputs to said control unit or said central control unit.

11. Displacement unit according to claim 1, wherein an interface of said control unit comprises inputs and outputs for signals and is a plug-in coupling device, said control unit is connectable by said coupling device to a bus line configured as central connecting line, to cooperate with said central control unit.

12. Displacement unit according to claim 1, wherein said one component is arranged to move relatively to a frame-shaped other component so as to be relatively displaceable by means of said guiding device.

13. Displacement unit according to claim 1, wherein said interface of said control unit comprises inputs and outputs for signals and is built by a plug-in coupling device, said control unit is connectable by said coupling device to a bus line configured as a central connecting line, to cooperate with an external input and output device.

14. Displacement unit according to claim 1, wherein said control unit comprises a memory for storing individual motions of said drive.

15. Displacement unit according to claim 1, wherein said control unit comprises a control power source.

16. Displacement unit according to claim 1, wherein said control unit comprises an interface for an external power source.

17. Displacement unit according to claim 1, wherein said logic unit consists of at least one microprocessor connected by control lines and conductor lines with said interface.

18. Displacement unit according to claim 17, wherein said microprocessor is connected by control lines and conductor lines with an evaluation unit and a driver and a D/A converter and a memory for storing individual motions of the components.

19. Displacement unit according to claim 1, wherein said drive comprises an electric distribution bus bar.

20. Displacement unit according to claim 19, wherein control lines are integrated in said distribution bus bar.

21. Displacement unit according to claim 20, wherein said at least first one signaling and monitoring element and said at least one pressure fluid control valve and said control module are arranged displaceably on said electric distribution bus bars.

22. Displacement unit according to claim 19, wherein said drive comprises a pressure fluid distribution bar.

23. Displacement unit according to claim 22, wherein lines for said pressure fluid are integrated in said distribution bar.

24. Displacement unit according to claim 22, wherein said pressure fluid control valve is arranged on or in the pressure fluid distribution bar and is connectable by orifices with orifices for said pressure fluid provided in said distribution bar.

25. Displacement unit according to claim 24, wherein said electric distribution bus bar and the pressure fluid distributor bar for receiving said control module and pressure fluid control valve are disposed on at least one of said components, and control lines and conductor lines are integrated therein, the electric distribution bus bar and pressure fluid distribution bar being provided with orifices in order to connect with said control module and said at least one pressure fluid control valve as well as said drive.

26. Displacement unit according to claim 1, wherein said control unit is directly connected at said drive, said drive comprising a cylinder pipe and end face closing elements positioned so as to be adjustable relative to one another.

27. Displacement unit according to claim 1, wherein said at least one second signaling and monitoring element is a vibration sensor or force sensor.

28. Displacement unit according to claim 1, wherein said at least one second signaling and monitoring element is arranged on one of the components.

29. Displacement unit according to claim 1, wherein said the control unit has an input device for permitting a dialog between an operator and the control unit directly at the displacement unit.

30. Displacement unit according to claim 29, wherein said input device is a keyboard.

31. Displacement unit according to claim 29, wherein said input device is a touch screen.

32. Displacement unit according to claim 29, wherein the input device comprises a touch screen combined with a display element.

33. Displacement unit according to claim 32, wherein said display element is a display light-emitting diode.

* * * * *